United States Patent
Gao et al.

(10) Patent No.: US 8,116,684 B2
(45) Date of Patent: Feb. 14, 2012

(54) TECHNIQUES TO IMPROVE THE RADIO CO-EXISTENCE OF WIRELESS SIGNALS

(75) Inventors: Jie Gao, Sunnyvale, CA (US); Xntian Eddie Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 822 days.

(21) Appl. No.: 12/220,951

(22) Filed: Jul. 30, 2008

(65) Prior Publication Data

US 2010/0029204 A1  Feb. 4, 2010

(51) Int. Cl.
 *H04B 7/00* (2006.01)
(52) U.S. Cl. .................. 455/41.2; 455/552.1; 455/63.1; 455/88; 370/337
(58) Field of Classification Search .................. 455/41.2, 455/552.1, 63.1, 88, 226.1, 226.2, 227, 213, 455/339, 307; 370/337, 465
See application file for complete search history.

(56) References Cited

U.S. PATENT DOCUMENTS

| | | | | |
|---|---|---|---|---|
| 5,786,763 | A * | 7/1998 | Canipe | 340/572.7 |
| 6,442,375 | B1 * | 8/2002 | Parmentier | 455/78 |
| 6,639,938 | B1 * | 10/2003 | Goyette et al. | 375/132 |
| 6,892,076 | B2 * | 5/2005 | Maalismaa et al. | 455/552.1 |
| 6,917,815 | B2 * | 7/2005 | Hajimiri et al. | 455/552.1 |
| 7,020,472 | B2 * | 3/2006 | Schmidt | 455/450 |
| 7,058,040 | B2 * | 6/2006 | Schmidt | 370/337 |
| 7,058,434 | B2 * | 6/2006 | Wang et al. | 455/575.7 |
| 7,197,331 | B2 * | 3/2007 | Anastasakos et al. | 455/557 |
| 7,460,846 | B2 * | 12/2008 | Maalismaa et al. | 455/168.1 |
| 7,656,845 | B2 * | 2/2010 | Schmidt | 370/337 |
| 7,701,913 | B2 * | 4/2010 | Chen et al. | 370/338 |
| 7,831,219 | B2 * | 11/2010 | Heuermann et al. | 455/107 |
| 7,844,219 | B2 * | 11/2010 | Park et al. | 455/11.1 |
| 2002/0173337 | A1 * | 11/2002 | Hajimiri et al. | 455/552 |
| 2007/0066222 | A1 * | 3/2007 | Tao et al. | 455/41.2 |
| 2007/0099567 | A1 * | 5/2007 | Chen et al. | 455/41.2 |
| 2008/0026718 | A1 * | 1/2008 | Wangard et al. | 455/266 |
| 2008/0045152 | A1 * | 2/2008 | Boes | 455/63.1 |
| 2010/0309049 | A1 * | 12/2010 | Reunamaki et al. | 342/367 |
| 2011/0070824 | A1 * | 3/2011 | Braithwaite | 455/25 |

* cited by examiner

*Primary Examiner* — Minh D Dao
(74) *Attorney, Agent, or Firm* — Glen B Choi

(57) ABSTRACT

Techniques are described that can be used to perform one or more of the following actions in order to reduce signal interference between WLAN and BlueTooth radios that are proximate to one another. One action is to selectively reduce a filter bandwidth in a WLAN radio applied to a received WLAN radio signal to reduce BlueTooth signal interference. An additional or alternative action is to selectively indicate a WLAN radio channel bandwidth larger than a channel bandwidth used for the WLAN radio so that the BlueTooth radio avoids transmitting over the indicated channel bandwidth. An additional or alternative action is to selectively reduce BlueTooth transmitter power in response to antenna isolation between BT and WLAN radio being less than a first threshold in order to reduce the likelihood of WLAN radio front end saturation.

21 Claims, 4 Drawing Sheets

TECHNIQUES TO IMPROVE THE RADIO CO-EXISTENCE OF WIRELESS SIGNALS

FIELD

The subject matter disclosed herein relates to techniques to reduce interference from transmitted signals.

RELATED ART

Wireless local area network (WLAN) radios, such as IEEE 802.11 compliant radios, and Bluetooth (BT) radios are embedded in many platforms. WLAN and BT operate on the same unlicensed frequency band (2.4-2.5 GHz). There are many usage models that require the co-existence of WLAN and BT signals. For instance, there is a usage model of watching television or video over the Internet using WLAN while using the BT headset for the stereo audio. It is desirable to maintain the WLAN throughput within a certain range during BT transmissions. Throughput is the successful transmission rate of a messages delivered over a communication channel.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
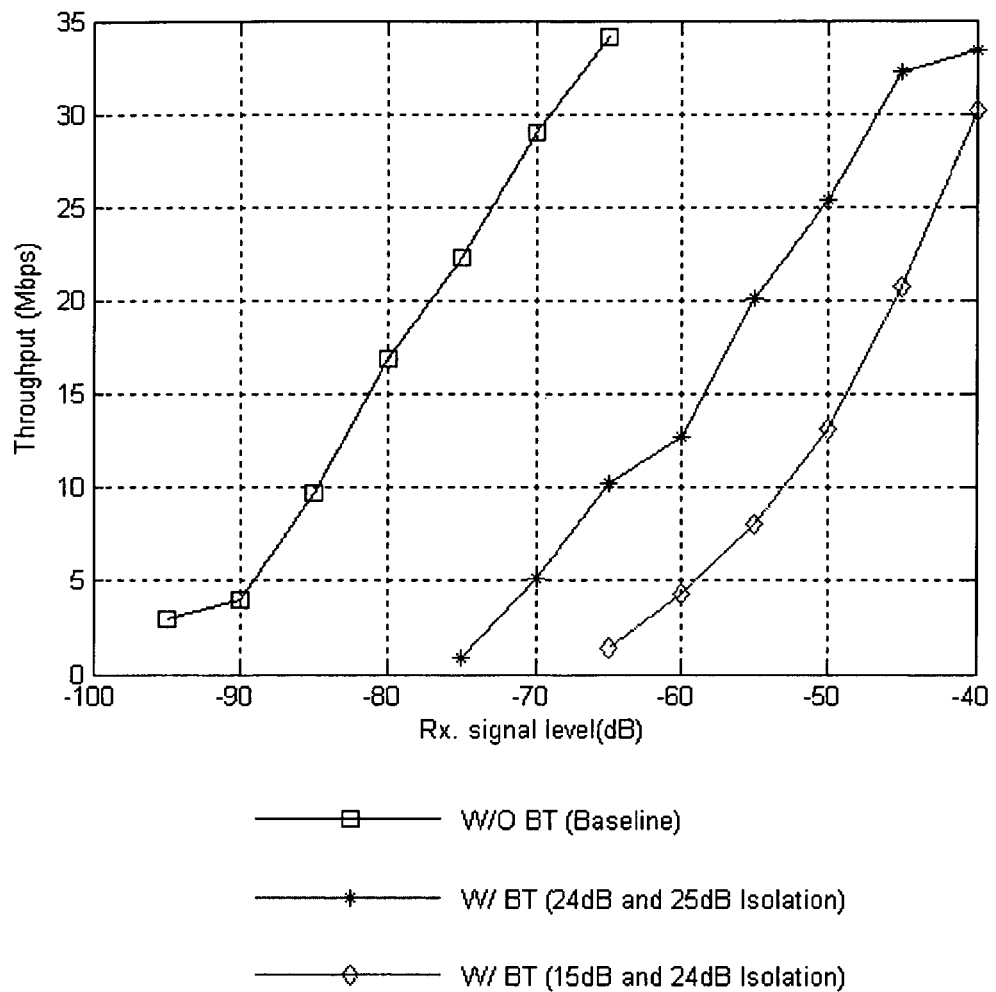
FIG. 1 shows a test result of WLAN radio throughput with and without interference by a BT radio.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to 802.11a, 802.11b, 802.11e, 802.11g, 802.11h, 802.11i, 802.11n.

Traditional techniques to enable the co-existence of WLAN and BT include time sharing and adaptive frequency hopping (AFH). AFH may be effective if antenna isolation is greater than 25 dB, BT out-of-channel emission is low, and BT signal transmissions do not saturate the WLAN RF front-end. The AFH solution may be inadequate in emerging platforms where the WLAN and BT antenna isolation is less than 15 dB and the BT transmit power is increased from 0 dBm to 4 dBm. For example, FIG. 1 shows a test result of WLAN radio throughput with and without interference by a BT radio. Received signal level may be significantly degraded by co-transmission of WLAN signals and BT signals.

Known WLAN radios use digital filters. If the BT radio transmits at a frequency that is 12 MHz away from the WLAN center frequency, the digital filter attenuates the BT interference signal but the attenuation may be insufficient. Accordingly, WLAN transmissions could suffer a significant impact from BT interference.

Techniques are described that may improve WLAN and BT radio co-existence for platforms. Several techniques are used to minimize the co-existence impact on throughput. The filter response characteristics of a programmable baseband digital filter are adjusted to increase attenuation of BT signals based on whether a BT radio transmits when a WLAN radio transmits. The BT radio may be in proximity to the WLAN radio or even at the same platform.

In addition, or alternatively, the WLAN radio may identify a larger operating bandwidth than is actually used so that when AFH is used, the BT radio avoids the larger operating bandwidth. For example, the WLAN radio may identify an operating bandwidth of 40 MHz even though the WLAN radio uses a 22 MHz operating bandwidth. The BT radio uses AFH to avoid the 40 MHz operating bandwidth instead of the 22 MHz operating bandwidth. Accordingly, there may be less likelihood of interference of the WLAN radio by the BT radio.

In addition, or alternatively, the BT radio may adaptively adjust the BT transmit power based on the estimated WLAN and BT antenna isolation and WLAN radio receive status. For example, if the estimated WLAN and BT antenna isolation is less than a threshold and the WLAN radio is receiving, then the transmission power of the BT radio may decrease.

Figure 2:
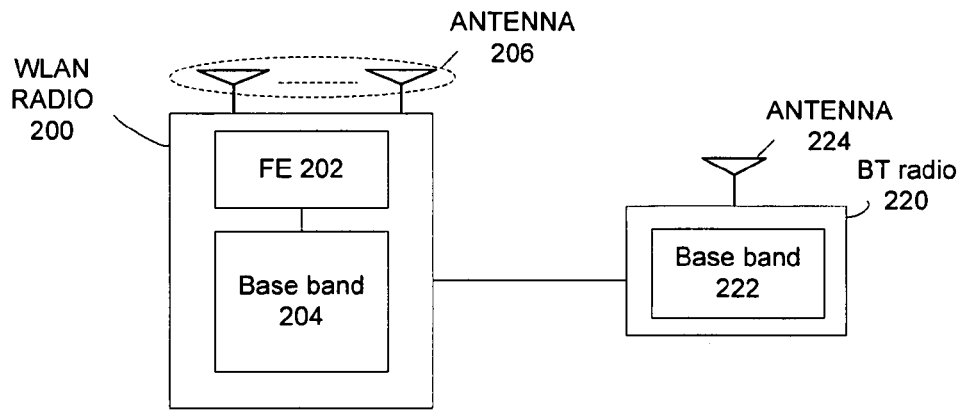
FIG. 2 depicts a system in accordance with an embodiment of the present invention.

FIG. 2 depicts a system in accordance with an embodiment of the present invention. The system may include WLAN radio 200 and BT radio 220 as well as other elements such as a processor, chipset, and memory (each not depicted). In the case where MIMO is supported, the system is used to receive signals from a main antenna and to receive signals from an auxiliary antenna. Other devices (not depicted) can communicate with the system of FIG. 2 using at least WLAN, WWAN, or BT.

WLAN radio 200 may include analog front end (FE) 202, base band 204, and antenna 206. WLAN radio 200 may be capable of transmitting and receiving in accordance with IEEE 802.11x. FE 202 is communicatively coupled to antenna 206 and provides signal filtering capabilities. In one embodiment, among other operations, FE 202 includes the capability to adjust the passband of its filter in response to transmission of both BT and WLAN signals. For example, FE 202 may include the logic to adjust filter passband in a manner described with regard to FIGS. 3A and 3B.

Among other operations, baseband 204 identifies to BT radio 220 a larger operating bandwidth than WLAN radio 200 actually uses. For example, base band 204 may identify an operating bandwidth of 40 MHz even though WLAN radio 200 uses a 22 MHz operating bandwidth. Baseband 222 of BT radio 220 may use AFH to avoid the larger operating bandwidth instead of the actual operating bandwidth. For example, baseband 204 of WLAN radio 200 and baseband 222 of BT radio 220 together may perform the operations described by FIG. 4.

Among other operations, baseband 222 of BT radio 220 may determine whether to reduce the transmit power of BT radio 220 based in part on whether estimated antenna isolation between WLAN radio 200 and BT radio 220 is below a threshold and/or whether WLAN radio 200 is receiving. For example, BT radio 220 may perform the operations described with regard to FIG. 5.

Figure 3A:
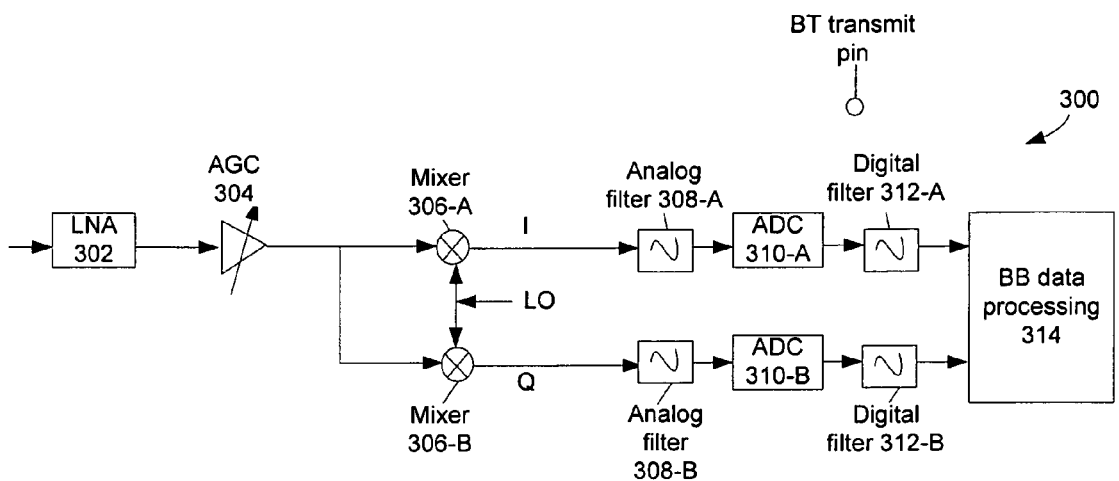
FIG. 3A depicts a system that includes filters with adjustable characteristics, in accordance with an embodiment of the present invention.

FIG. 3A depicts a system 300 that includes filters with adjustable characteristics, in accordance with an embodiment of the present invention. Low noise amplifier (LNA) 302 boosts the energy of an input signal received by system 300 in the operating range of the radio (e.g., 2.4-2.5 GHz) and reduces the noise of the input signal. Automatic gain control (AGC) 304 changes the amplitude of the input signal from LNA 302 to be within a desired range. Mixers 306-A and 306-B mix an RF signal (e.g., in the range of 2.4-2.5 GHz or other operating frequency) signal with an LO signal (e.g., 2.45 GHz) to provide a base band signal with frequency in a range of −20 MHz to 20 MHz. Mixer 306-A provides a real component (I) of the base band signal whereas mixer 306-B provides an imaginary component (Q) of the base band signal.

Analog filters 308-A and 308-B filter out interference from the base band signals. Analog filters 308-A and 308-B can be implemented as low pass filters. In one embodiment, a bandwidth of the low pass filters may be 20 MHz for IEEE 802.11n compliant radios and 10 MHz for 802.11a, b, and g compliant radios. For a base band signal, the bandwidth of the low pass filter may be half of the signal bandwidth. Analog to digital converters (ADC) 310-A and 310-B convert analog format signals to digital format and transfer the digital signals to digital filters 312-A and 312-B.

In accordance with an embodiment of the present invention, the bandpass filter characteristics of digital filters 312-A and 312-B are adjustable based on whether a BT radio and WLAN radio are transmitting and the BT radio and WLAN radio are proximate to each other. The BT radio and WLAN radio may be proximate such as when they are in the same computer platform or the BT radio and WLAN radio are in separate platforms but positioned adjacent to one another. A determination of whether the BT radio is transmitting may be made by use of a BT transmit pin that indicates that a BT radio is in transmit mode. For example, BT logic in the same platform as that of the WLAN radio can cause the BT transmit pin to indicate that the BT radio is in transmit mode.

Figure 3B:
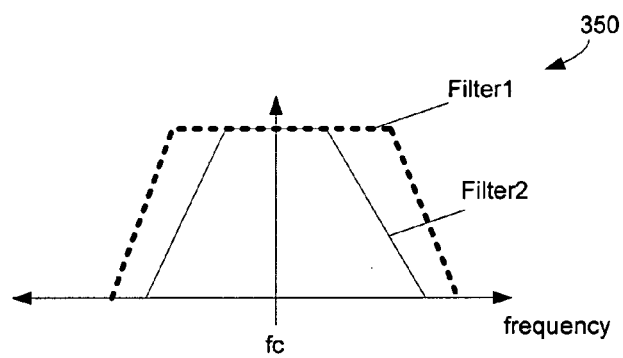
FIG. 3B depicts two filter characteristics of digital filters, in accordance with an embodiment of the present invention.

FIG. 3B depicts two filter characteristics of digital filters 312-A and 312-B, in accordance with an embodiment of the present invention. In one embodiment, the frequency response of digital filters 312-A and 312-B are adjusted to apply response Filter2 in response to a BT radio transmitting proximate to the WLAN radio. In one embodiment, the frequency response of digital filters 312-A and 312-B are adjusted to apply response Filter1 in response to no BT radio transmitting proximate to the WLAN radio. Response Filter2 better attenuates the BT transmissions than response Filter1 and thereby assists in WLAN signal acquisition and demodulation. For example, response Filter1 may provide a 3 dB bandwidth of 20 MHz whereas response Filter2 may provide a 3 dB bandwidth of approximately 15 MHz. Response Filter2 may increase the filter attenuation of BT signals above 11 MHz. For example, response Filter1 may attenuate BT interference 2 dB at 12 MHz offset from the center frequency whereas at 12 MHz offset from the center frequency, response Filter2 may provide approximately 10-15 dB attenuation. Response Filter2 may cause loss of 1 dB WLAN signal power due to attenuation, but the rejection of the BT transmission may compensate the loss.

Referring back to FIG. 3A, in one embodiment, digital filters 312-A and 312-B can be implemented as finite impulse response (FIR) or infinite impulse response (IIR) filters.

BB data processing block 314 receives digital signals, demodulates the digital signals, and detects information from received WLAN radio signal.

Figure 3C:
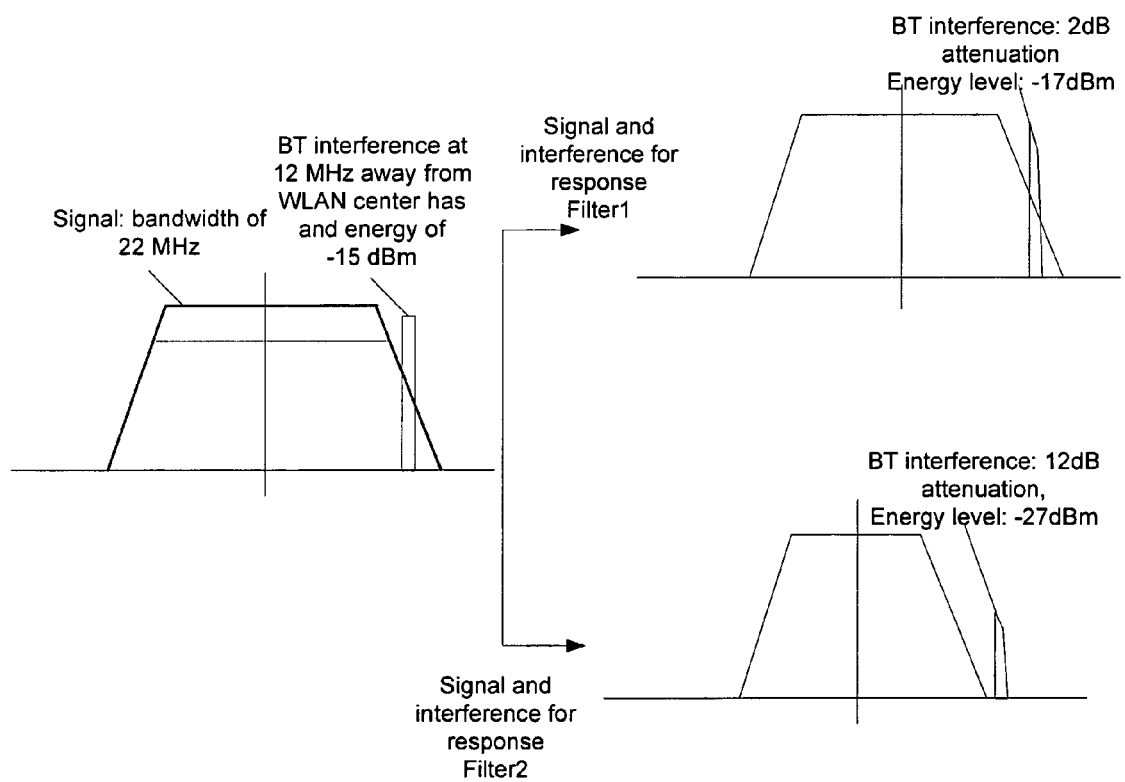
FIG. 3C depicts energy levels of BT interference signals resulting from different filter characteristics.

FIG. 3C depicts a graph showing interfering energy under filter responses Filter1 and Filter2, in accordance with an embodiment of the present invention. A BT interference signal at 12 MHz away from the WLAN center frequency may have an energy of −15 dBm. At 12 MHz away from the WLAN center frequency, response Filter1 may cause an 2 dB attenuation of the BT interference signal so that the BT interference signal has an energy level of −17 dBm. At 12 MHz away from the WLAN center frequency, response Filter2 may cause a 12 dB attenuation of the BT interference signal so that the BT interference signal has an energy level of −27 dBm. Accordingly, response Filter2 reduces the energy level of a BT interference signal more than the reduction by response Filter1.

Figure 4:
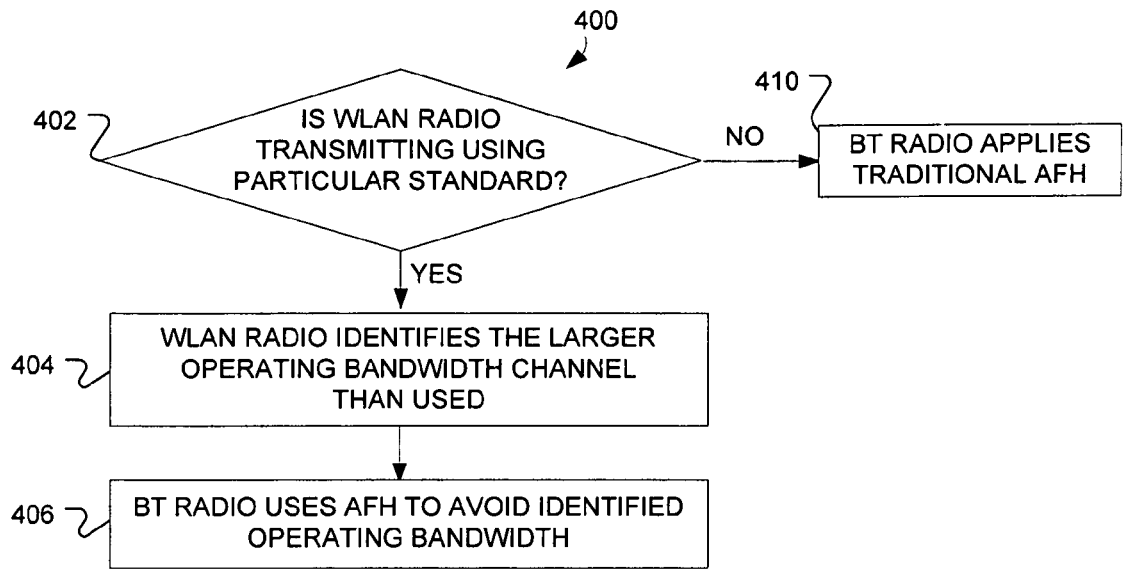
FIG. 4 depicts a process that can be used to communicate the channel used by a WLAN radio to a Blue Tooth radio, in accordance with an embodiment of the present invention.

FIG. 4 depicts a process 400 that can be used to communicate the channel used by a WLAN radio to a Blue Tooth radio, in accordance with an embodiment of the present invention. In block 402, the process determines whether a WLAN radio is transmitting according to a particular standard. For example, block 402 may include determining whether a WLAN radio is transmitting according to IEEE 802.11n or 802.11a, b, or g. For example, a BT radio software driver executed by a processor may determine if a WLAN radio, proximate to the BT radio, supports the particular standard. If the WLAN radio transmits according to the particular standard, then block 404 follows block 402. If the WLAN radio does not transmit according to the particular standard, then block 410 follows block 402. For example, if the WLAN radio is not supporting IEEE 802.11n but instead supports IEEE 802.11a, b, or g, then block 410 may follow block 402.

In block 404, the WLAN radio identifies to a BT radio a larger channel bandwidth used in WLAN communications than is actually used. For example, the WLAN radio may use a 20 MHz channel but may report use of a 40 MHz channel, although other channel sizes may be used or reported. For example, the WLAN radio may communicate the channel bandwidth to the BT radio using a hardware pin available through an Intel Wireless Coexistence System (WCS) (not depicted). For example, the WLAN radio may report the channel to the system operating system and the operating system communicates the channel to the BT radio.

In block 406, the BT radio applies AFH to avoid the reported WLAN operating bandwidth. For example, the BT radio may use its conventional AFH techniques to avoid the reported operating bandwidth. Avoiding a larger channel bandwidth than used may reduce interference of WLAN signals by transmitted BT radio signals.

In block 410, process 400 causes the BT radio to apply an AFH technique to avoid channels used by the WLAN radio. Block 410 may include the WLAN radio reporting the channel bandwidth actually used.

Figure 5:
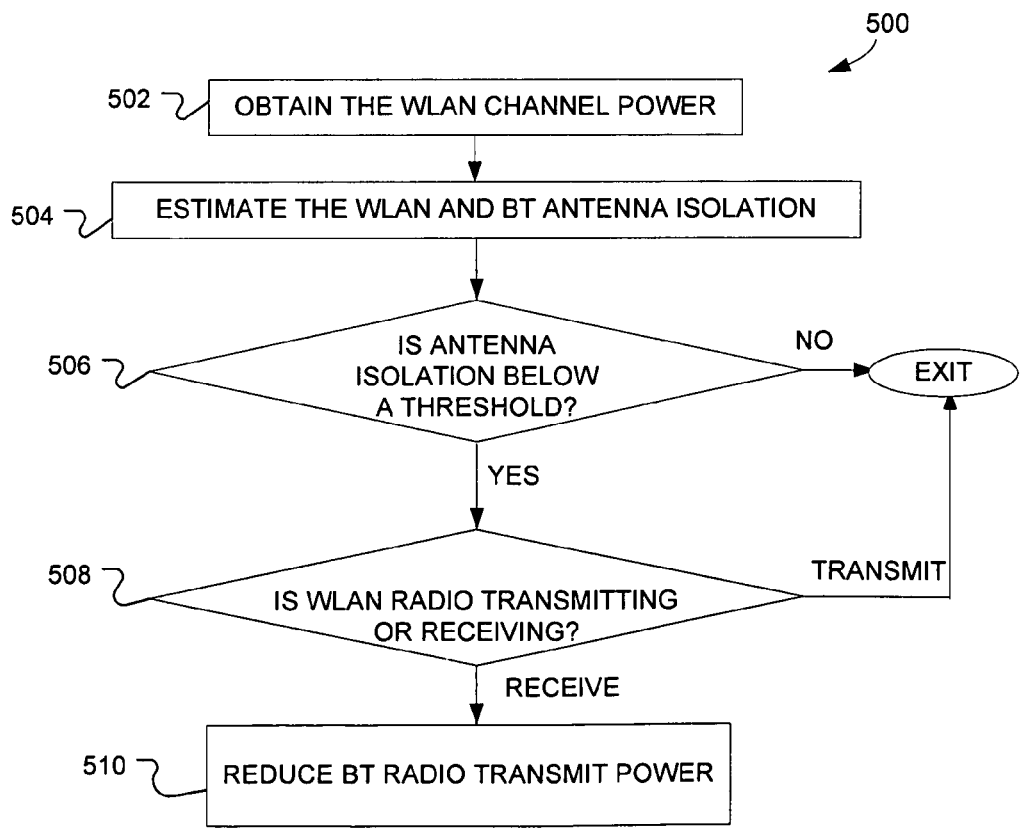
FIG. 5 depicts a process that reduces BT transmit power under certain conditions, in accordance with an embodiment of the present invention.

FIG. 5 depicts a process 500 that reduces BT radio transmission power under certain conditions, in accordance with an embodiment of the present invention. The BT radio may be proximate to a WLAN radio. Block 502 may include the BT radio detecting WLAN channel power. For example, the BT radio could use AFH to determine occupied frequencies by sensing signal power for a range of frequencies. The sensed signal power, which is a measurement of received WLAN radio signals, may represent the transmitted signal power from a WLAN radio because of proximity of the WLAN radio to the BT radio. The measurement of received WLAN radio signals may be an estimate of WLAN channel power.

Block 504 may include estimating the WLAN and BT antenna isolation. The estimated antenna isolation can be a difference between the standard WLAN transmitted power and channel power measured in block 502. For IEEE 802.11, standard transmitted power is 17 dBm.

Block 506 may include determining whether the estimated antenna isolation is less than a threshold. Antenna isolation may be calculated as the transmitted WLAN signal power (17 dBm) minus the received WLAN signal power. For example, if the received WLAN signal is 2 dBm, the antenna isolation is 15 dB. In one embodiment, the threshold is 15 dB because the BT radio could saturate the WLAN radio front end if the antenna isolation is less than 15 dB for a BT radio transmit power of 0 dBm and WLAN radio 1 dB compression point of −15 dBm. If the estimated antenna isolation is less than the threshold, then block 508 may follow block 506. If the estimated antenna isolation is not less than the threshold, the process ends and process 500 may not adjust the BT radio transmission power.

Block 508 may include determining whether the WLAN radio is receiving or transmitting. If the WLAN radio is receiving, block 510 may follow block 508. If the WLAN network interface is transmitting, the process ends and the BT radio transmission power may not be adjusted by process 500. When the WLAN radio is receiving, a BT radio transmission could interfere with the receiving WLAN radio. Adjusting the BT transmission power in the event that the WLAN radio is receiving can reduce interference from a BT transmitted signal. In some embodiments, block 508 is omitted.

Block 510 may include reducing the BT transmission power. For example, block 510 may reduce the BT transmission power by T dB, where T=15 dB—antenna isolation determined in block 504. Reducing the BT transmission power reduces interference by BT transmitted signals against received WLAN signals. Reducing the BT transmit power may avoid saturating the WLAN front-end.

A conventional power control techniques for BT is based on the path loss between BT transmit and receive antennas. If the path loss is high, the BT radio increases its transmit power (for instance, increase from −20 dBm to 0 dBm). However, process 500 controls BT radio power by considering antenna isolation between BT radio and WLAN radio.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
    selectively requesting adjusting a filter bandwidth in a WLAN radio applied to a received WLAN radio signal in response to transmission of a signal from a BlueTooth radio;
    selectively requesting indicating to the BlueTooth radio a WLAN radio channel bandwidth larger than a channel bandwidth actually used by the WLAN radio; and
    selectively requesting reducing BlueTooth transmitter power in response to antenna isolation between BlueTooth and WLAN radio being less than a first threshold.

2. The method of claim 1, wherein the adjusting the filter bandwidth comprises reducing the bandwidth of a digital filter.

3. The method of claim 1, further comprising requesting the BlueTooth radio to utilize adaptive frequency hopping for a BlueTooth radio to avoid transmitting over the indicated larger bandwidth in response to the indication of the channel bandwidth.

4. The method of claim 1, wherein the selectively requesting indicating a WLAN radio channel bandwidth larger than a channel bandwidth actually used for the WLAN radio occurs in response to the WLAN radio transmitting using IEEE 802.11n.

5. The method of claim 1, wherein reducing BlueTooth transmitter power comprises:
    obtaining a WLAN received signal power;
    estimating antenna isolation between the WLAN radio and BlueTooth transmitter; and
    in response to the WLAN radio in receiving mode, reducing the BlueTooth transmitter power by a difference between a threshold for WLAN radio saturation and the estimated antenna isolation.

6. The method of claim 5, wherein obtaining a WLAN received signal power comprises using adaptive frequency hopping.

7. The method of claim 1, wherein the indicating to the BlueTooth radio a WLAN radio channel bandwidth larger than a channel bandwidth actually used by the WLAN radio comprises using a hardware pin.

8. The method of claim 1, wherein the WLAN radio performs the indicating to the BlueTooth radio a WLAN radio channel bandwidth larger than a channel bandwidth actually used.

9. An apparatus configurable to use:
    logic to selectively adjust a passband of one or more filters of a WLAN radio in response to transmission by a BlueTooth radio;
    logic to indicate to the BlueTooth radio a transmission band of a WLAN radio that is larger than that used by the WLAN radio in response to the WLAN radio using a first protocol and being proximate a BlueTooth radio and
    logic to reduce BlueTooth radio transmission power in response to an antenna isolation between a WLAN radio and BlueTooth radio being less than a threshold.

10. The apparatus of claim 9, wherein to adjust the passband, the logic is to reduce the passband to attenuate both received WLAN radio signals and BlueTooth radio signals in response to simultaneous transmission of both WLAN radio and BlueTooth radio signals.

11. The apparatus of claim 9, further comprising logic to utilize adaptive frequency hopping for the BlueTooth radio to avoid transmitting over the indicated larger transmission band.

12. The apparatus of claim 9, wherein the first protocol includes IEEE 802.11n.

13. The apparatus of claim 9, wherein the logic to reduce BlueTooth radio transmission power is to:
    obtain a WLAN received signal power;
    estimate antenna isolation between the WLAN radio and BlueTooth transmitter, and
    in response to the WLAN radio in receiving mode, reduce the BlueTooth transmitter power by a difference between a threshold for WLAN radio saturation and the estimated antenna isolation.

14. The apparatus of claim 13, wherein to obtain a WLAN received signal power, the logic is to use adaptive frequency hopping.

15. The apparatus of claim 9, wherein the logic to indicate to the BlueTooth radio a transmission band of a WLAN radio is to use a hardware pin.

16. The apparatus of claim 9, wherein the logic to indicate to the BlueTooth radio comprises a WLAN radio.

17. A system comprising:
    a BlueTooth radio;
    a WLAN radio, the BlueTooth radio and the WLAN radio communicatively coupled to a computing platform;
    at least one antenna communicatively coupled to the WLAN radio; and
    control logic to request to perform:
        selectively adjust a passband of one or more filters of the WLAN radio in response to transmission by the BlueTooth radio,
        indicate a transmission band of the WLAN radio that is larger than that used by the WLAN radio in response to the WLAN radio using a first protocol and being proximate the BlueTooth radio, and
        reduce BlueTooth radio transmission power in response to an antenna isolation between the WLAN radio and the BlueTooth radio being less than a threshold.

18. The system of claim 17, wherein the adjusted passband comprises a reduced passband that attenuates both received WLAN radio and BlueTooth radio signals.

19. The system of claim 17, further comprising logic to utilize adaptive frequency hopping for the BlueTooth radio to avoid transmitting over the indicated transmission band.

20. The system of claim 17, wherein to reduce BlueTooth radio transmission power comprises:
    obtain a WLAN radio transmit power using adaptive frequency hopping;
    estimate antenna isolation between the WLAN radio and the BlueTooth radio; and
    in response to the WLAN radio in receiving mode, reduce the BlueTooth transmitter power by a difference between a threshold for WLAN radio saturation and the estimated antenna isolation.

21. The system of claim 17, wherein the first protocol includes IEEE 802.11n.

* * * * *